(12) United States Patent
Birman et al.

(10) Patent No.: US 11,131,847 B2
(45) Date of Patent: Sep. 28, 2021

(54) HORN-SHAPED ABSORPTION ELEMENT IN A HEADS-UP DISPLAY

(71) Applicant: Continental Automotive Systems, Inc., Auburn Hills, MI (US)

(72) Inventors: Vyacheslav Birman, Auburn Hills, MI (US); Guoqing Wang, Rochester Hills, MI (US); Hao Wang, Auburn Hills, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 100 days.

(21) Appl. No.: 16/431,967

(22) Filed: Jun. 5, 2019

(65) Prior Publication Data
US 2020/0386984 A1     Dec. 10, 2020

(51) Int. Cl.
*G02B 26/08* (2006.01)
*G02B 27/01* (2006.01)
*B60K 35/00* (2006.01)

(52) U.S. Cl.
CPC ..... *G02B 26/0833* (2013.01); *G02B 27/0101* (2013.01); *B60K 35/00* (2013.01); *B60K 2370/1529* (2019.05)

(58) Field of Classification Search
CPC ............ G02B 26/0833; G02B 27/0101; G02B 2027/0181; G02B 2027/0183; G02B 27/0103; G02B 2027/0105; G02B 2027/0107; G02B 2027/0109; G02B 2027/011; G02B 2027/0112; G02B 2027/0114; G02B 2027/0116; G02B 2027/0118; G02B 2027/012; G02B 2027/0123; G02B 2027/0125; G02B 2027/0127; G02B 2027/0129; G02B 2027/013; G02B 2027/0132; G02B 2027/0134; G02B 2027/0136; G02B 2027/0174; G02B 2027/0178; G02B 27/01; G02B 27/0172; G02B 27/017; G02B 2027/015; G02B 2027/0152; G02B 27/0176; G02B 2027/014; B60K 2370/1529; B60K 35/00; G03H 2001/043; G03H 2240/25; G03H 2270/21
See application file for complete search history.

(56) References Cited

U.S. PATENT DOCUMENTS

| 9,826,299 | B1 * | 11/2017 | Osterhout | G06F 3/03545 |
| 2009/0153941 | A1 * | 6/2009 | Oden | G09G 3/346 |
| | | | | 359/292 |
| 2010/0149073 | A1 * | 6/2010 | Chaum | G02B 27/0172 |
| | | | | 345/8 |
| 2011/0267550 | A1 * | 11/2011 | Coleman | G03B 21/008 |
| | | | | 348/759 |
| 2012/0224062 | A1 * | 9/2012 | Lacoste | G02B 27/01 |
| | | | | 348/148 |

(Continued)

*Primary Examiner* — Jennifer D. Carruth

(57) ABSTRACT

Anomalous images generated by a picture generation unit of a heads up display are suppressed by a light-suppressing horn placed inside the picture generated unit. The horn is sized, shaped and arranged to receive scattered light that is reflected from mirrors of a digital micromirror device, which are in their "off" position but which nevertheless reflect light toward surfaces of the picture generation unit and which are subsequently emitted from the picture generation unit lens.

5 Claims, 2 Drawing Sheets

(56) References Cited

U.S. PATENT DOCUMENTS

| | | | |
|---|---|---|---|
| 2014/0285429 A1* | 9/2014 | Simmons | G02B 27/0172 |
| | | | 345/156 |
| 2015/0323793 A1* | 11/2015 | Sakai | G02B 26/0816 |
| | | | 359/223.1 |
| 2019/0364250 A1* | 11/2019 | Malfait | G03B 21/16 |
| 2020/0218141 A1* | 7/2020 | Van Rafelghem | |
| | | | H05K 7/20336 |
| 2020/0301137 A1* | 9/2020 | Tanaka | G02B 26/105 |
| 2020/0371352 A1* | 11/2020 | Birman | G02B 27/0101 |

* cited by examiner

HORN-SHAPED ABSORPTION ELEMENT IN A HEADS-UP DISPLAY

DETAILED DESCRIPTION

Figure 1:
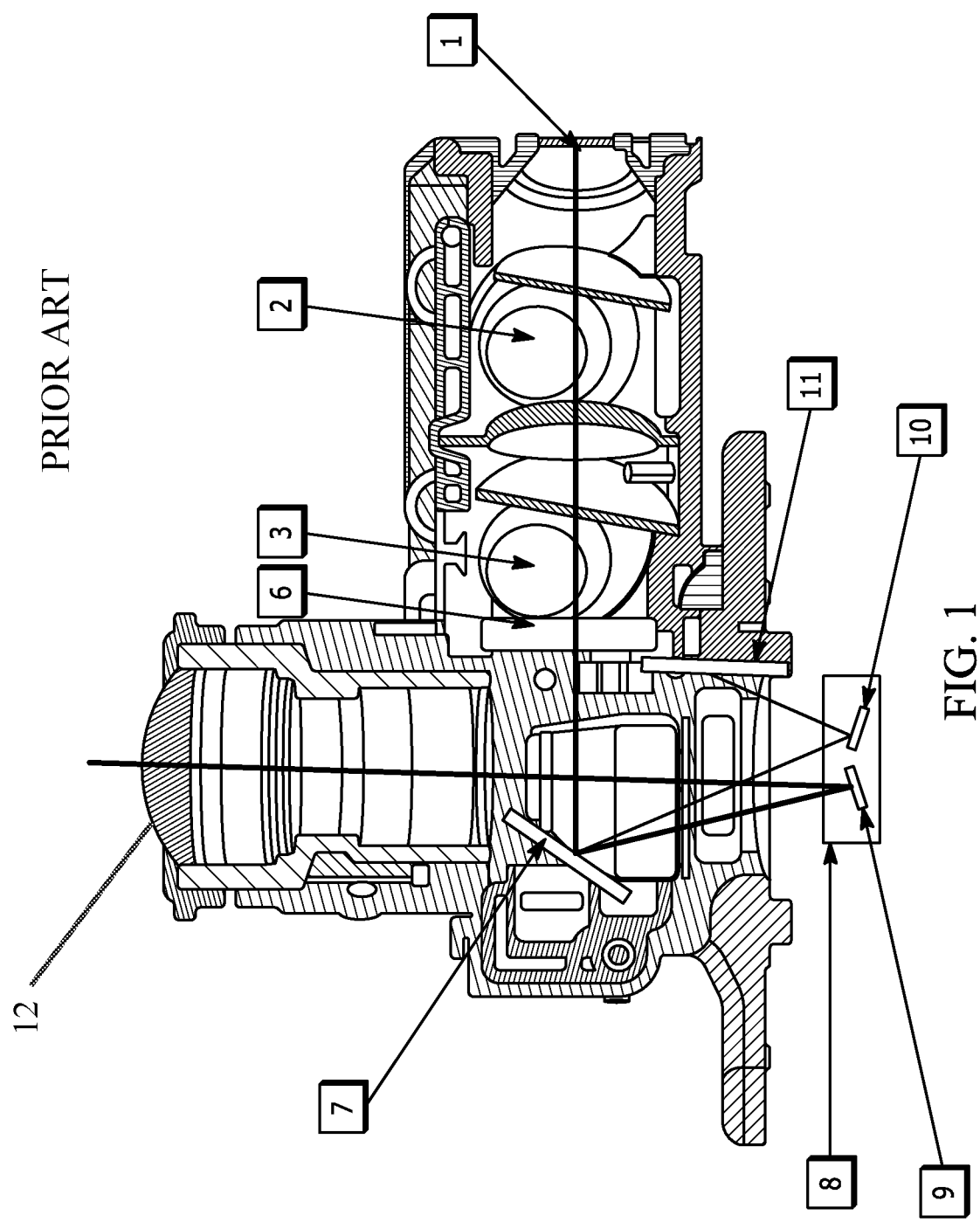
FIG. 1 is a cross-sectional diagram of a prior art picture generation unit (PGU) for a heads-up display device for use in a motor vehicle.

FIG. 1 is a cross-sectional diagram of a prior art picture generation unit 10 or "PGU" for a motor vehicle heads-up display. In FIG. 1, a light emitting diode (LED) 1 generates light, represented in FIG. 1 by a light beam 2, which travels toward and strikes a fixed, inclined mirror 7. The purpose of the fixed inclined mirror 7 is to direct the light beam 2 toward a prior art digital micromirror device or DMD 8. Tiny mirrors in the DMD 8 are electrically controlled by a processor (not shown). Signals provided to the DMD 8 by the processor cause each mirror to move between two distinctly different inclination angles, best seen in FIG. 2.

Figure 2:
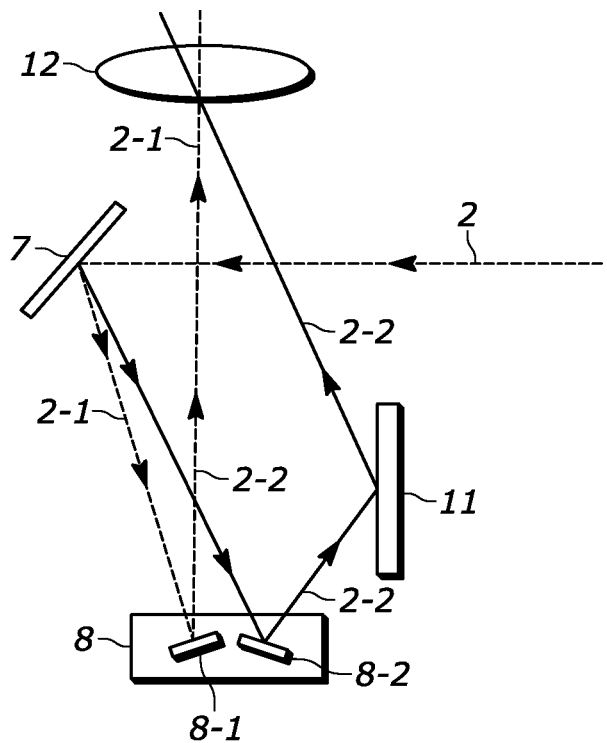
FIG. 2 is a schematic depiction of the pathways that light follows as it travels through a prior art PGU shown in FIG. 1.

Referring now to FIG. 2, the DMD 8 comprises hundreds of tiny, electrically movable mirrors, two of which are shown in FIG. 2. Each mirror of the DMD 8 is considered to have a "first" position, depicted in FIG. 2 by the mirror identified by reference numeral 8-1, and a different "second" position, depicted in FIG. 2 by the mirror identified by reference numeral 8-2.

When a light beam 2 strikes the fixed inclined mirror 7, a first "portion" 2-1 of the beam 2 from the LED 1 is reflected off the fixed inclined mirror 7 and strikes one or more micromirrors 8-1 in their "first" position. The first portion 2-1 of the beam 2 reflected off micromirrors in the "first" position are reflected from the micromirrors 8-1 toward an output lens 12 of the PGU 10 and by which the PGU generates an image (not shown) on a display surface, such as a windshield (not shown).

When a second and different scattered "portion" 2-2 of the beam 2 is reflected off the fixed, inclined mirror 7 at a slightly different angle, the scattered portion of the beam 2 will strike one or more different micromirrors 8-2 in their "second" position and thus reflected from the second micromirrors 8-2 in a different direction, i.e., toward a side wall 11 or other interior surface of the PGU 10 and not toward the lens 12.

Even if the side wall 11 or other interior surface is black, at least some of the scattered beam 2-2 that strikes the side wall 11 or other interior surface of the PGU will be reflected off the side wall 11 or other interior surface and toward the output lens 12, albeit from a different origin. When scattered and re-reflected beams 2-2 exit the output lens 12, they will of course strike the display surface and create an anomalous image on that surface. Preventing the scattered beam 2-2 from leaving the PGU would therefore be advantageous.

Figure 3:
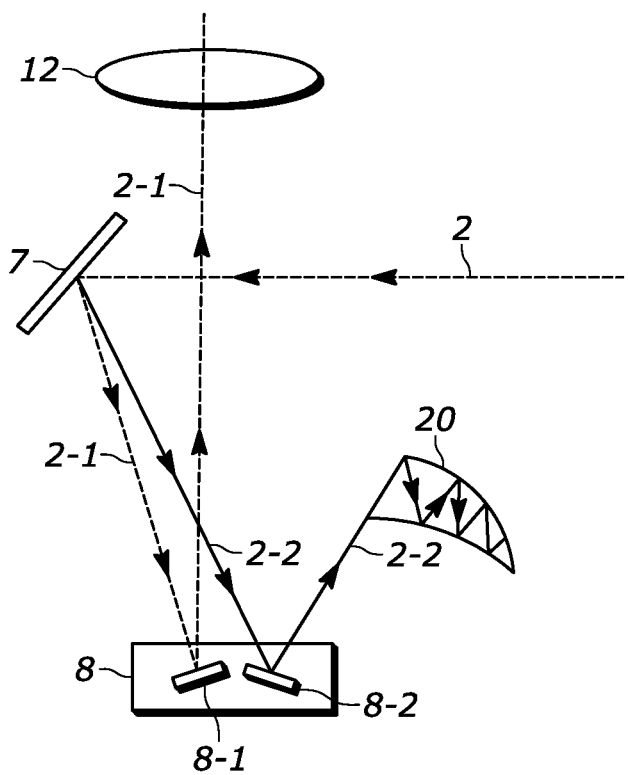
FIG. 3 is a schematic depiction of the pathway that light follows through a PGU that is provided a horn-shaped light absorption unit.

FIG. 3 is a schematic depiction of a pathway that scattered light 2-2 will follow through the PGU 10 of FIG. 1 and FIG. 2 when the PGU 10 is equipped with a horn-shaped light absorption unit 20. In the preferred embodiment, the PGU light source 1 comprises at least two dichroic mirrors and three light emitting diodes. The horn-shaped light absorption unit 20 is located in the PGU 10 at a location where scattered light 2-2 from the inclined mirror 7 will be directed into the relatively large opening of the horn 20.

As shown in FIG. 3, the light-suppressing horn 20 is essentially a cone having an inside surface that tapers inwardly. The horn's inside surface is coated to provide a substantially black surface color.

When a light beam 2-2 strikes the black, inside surface of the horn 20, the beam 2-2 will be re-reflected as it travels into the horn 20. Each reflection attenuates or reduces the relative intensity of the beam 2-2. The repeated reflections essentially absorb the beam 2-2 such that it cannot produce an anomalous image, even if it were somehow re-reflected toward and out the lens 12.

The foregoing description is for purposes of illustration. The true scope of the invention is set forth in the following claims.

What is claimed is:

1. A picture generation unit for a heads-up display, the picture generation unit comprising:
    a light source configured to direct image-generating light toward a mirror;
    a mirror, configured to receive light from the light source and reflect received light toward a digital micromirror device;
    a digital micromirror device (DMD) comprising a plurality of individually operable mirrors, each of the plurality of individually operable mirrors having a first position, which directs light reflected toward the DMD by the mirror to an output lens for the heads-up display and also having a second position, which directs reflected toward the DMD by the mirror away from the output lens;
    a light-suppressing horn arranged to receive a reflected light from a digital micromirror device when the micromirror device is in its second position, the light-suppressing horn is cone shaped with an inside light-suppressing surface that tapers inwardly to a common point, the inside light-suppressing surface of the light suppressing horn is configured to reflect and repeated re-reflect said light toward the common point.

2. The picture generation unit for a heads-up display of claim 1, wherein the light source comprises a plurality dichroic mirrors and plurality of light emitting diodes LEDs.

3. The picture generation unit for a heads-up display of claim 1, wherein the tapered inside light-suppressing surface is substantially black.

4. The picture generation unit for a heads-up display of claim 2, wherein the inside light-suppressing surface black in color.

5. The picture generation unit for a heads-up display of claim 1, wherein the mirror comprises a mirror fixed relative to the light source and the DMD.

* * * * *